United States Patent

Daly et al.

Patent Number: 5,435,984
Date of Patent: Jul. 25, 1995

[54] CATALYST FOR THE SYNTHESIS OF CHLORINE DIOXIDE

[75] Inventors: Francis P. Daly, Murray, Ky.; John Deuber, Nutley, N.J.; Daniel Ostgard, Murray, Ky.

[73] Assignee: Degussa Corporation, Ridgefield Park, N.J.

[21] Appl. No.: 8,971

[22] Filed: Jan. 26, 1993

Related U.S. Application Data

[63] Continuation-in-part of Ser. No. 875,014, Apr. 28, 1992, abandoned.

[51] Int. Cl.⁶ .................. C01B 11/02; B01J 21/04; B01J 21/08
[52] U.S. Cl. .................. 423/477; 502/261; 502/262; 502/302; 502/303; 502/325
[58] Field of Search .............. 423/477, 478, 479, 480; 502/262, 263, 261, 302, 303, 339, 333, 334, 332, 325

[56] References Cited

U.S. PATENT DOCUMENTS

| | | |
|---|---|---|
| 1,673,691 | 6/1928 | Liljenroth et al. |
| 2,478,916 | 8/1949 | Haensel et al. .............. 196/50 |
| 2,911,357 | 11/1959 | Meyers et al. .............. 208/138 |
| 2,927,141 | 3/1960 | Cohn et al. .............. 260/677 |
| 3,079,232 | 2/1963 | Anderson et al. .............. 23/157 |
| 3,336,199 | 8/1967 | Gac et al. .............. 260/621 |
| 3,367,888 | 2/1968 | Hoekstra .............. 252/466 |
| 3,380,934 | 4/1968 | Batzold .............. 252/462 |
| 3,386,915 | 6/1968 | Rutschi et al. |
| 3,442,973 | 5/1969 | Sinfelt et al. .............. 260/683.65 |
| 3,617,518 | 11/1971 | Sinfelt et al. .............. 208/138 |
| 3,770,616 | 11/1973 | Kominami et al. .............. 208/138 |
| 3,775,342 | 11/1973 | Kronig et al. .............. 252/430 |
| 3,943,053 | 3/1976 | Kovach et al. .............. 208/143 |
| 3,957,688 | 5/1976 | Farha, Jr. et al. .............. 252/455 R |
| 3,962,139 | 6/1976 | van de Moesdijk et al. .............. 252/463 |
| 3,993,572 | 11/1976 | Hindin et al. |
| 4,000,207 | 12/1976 | Kaiser .............. 260/675.5 |
| 4,021,374 | 12/1977 | Petro et al. .............. 252/473 |
| 4,051,229 | 9/1977 | Isa et al. .............. 423/477 |
| 4,110,254 | 8/1978 | Lauder |
| 4,154,810 | 5/1979 | Isa et al. .............. 423/478 |
| 4,169,134 | 8/1979 | Isa et al. .............. 423/478 |
| 4,178,356 | 12/1979 | Shibuya et al. |
| 4,189,405 | 2/1980 | Knapton et al. |
| 4,303,625 | 12/1981 | Cull |
| 4,318,827 | 3/1982 | Antos |
| 4,362,707 | 12/1982 | Hardee et al. |
| 4,374,047 | 2/1983 | Bozon et al. .............. 252/472 |
| 4,381,290 | 4/1983 | Hardee et al. .............. 423/478 |
| 4,421,730 | 12/1983 | Isa et al. .............. 423/478 |
| 4,490,481 | 12/1984 | Boitiaux et al. .............. 502/330 |
| 4,499,077 | 2/1985 | Stockel et al. |
| 4,501,824 | 2/1985 | Hardee et al. |
| 4,536,482 | 8/1985 | Carcia .............. 502/5 |
| 4,542,008 | 9/1985 | Capuano et al. |
| 4,624,941 | 11/1986 | Berndt et al. .............. 502/302 |
| 4,654,208 | 3/1987 | Stockel et al. |
| 4,696,811 | 9/1987 | Ratcliff |
| 4,698,324 | 10/1987 | Haruta et al. .............. 502/243 |
| 4,711,741 | 12/1987 | Fujishima et al. |
| 4,731,192 | 3/1988 | Kenjo |
| 4,755,498 | 7/1988 | Setzer et al. .............. 502/303 |
| 4,770,868 | 9/1988 | Norell |
| 4,808,394 | 2/1989 | Kolts et al. .............. 423/437 |
| 4,810,688 | 3/1989 | Ewert et al. .............. 502/174 |
| 4,855,135 | 8/1989 | Ratcliff |
| 4,978,535 | 12/1990 | Ractliff |
| 4,986,973 | 1/1991 | Swedin et al. |
| 4,997,626 | 3/1991 | Dziabo et al. .............. 422/37 |
| 4,999,177 | 3/1991 | Chen et al. .............. 423/415 A |
| 5,002,746 | 3/1991 | Norell .............. 423/479 |
| 5,008,096 | 4/1991 | Ringo .............. 423/477 |
| 5,032,565 | 7/1991 | Berrebi .............. 502/331 |
| 5,066,477 | 11/1991 | Zell et al. .............. 423/479 |
| 5,078,908 | 1/1992 | Ripley |
| 5,093,097 | 3/1992 | Engstroem et al. .............. 423/479 |
| 5,152,912 | 10/1992 | Dziabo et al. .............. 252/106 |

FOREIGN PATENT DOCUMENTS

0065819 12/1982 European Pat. Off.

Primary Examiner—Benjamin R. Fuller
Assistant Examiner—Valerie Ann Lund
Attorney, Agent, or Firm—Beveridge, DeGrandi, Weilacher & Young

[57] ABSTRACT

Chlorine dioxide is generated from an aqueous solution of sodium chlorite in the presence of a catalyst having a higher activity and a reduced rate of deactivation. The catalyst is preferably a $Pd/Al_2O_3$ of palladium and another platinum group metal (e.g., $Pd+Pt/Al_2O_3$) or palladium and a Group IB metal (e.g., $Pd+Au/Al_2O_3$) catalyst containing $La_2O_3$ and $Nd_2O_3$.

6 Claims, 3 Drawing Sheets

CATALYST FOR THE SYNTHESIS OF CHLORINE DIOXIDE

REFERENCE TO A RELATED APPLICATION

The present application is a continuation-in-part of our U.S. patent application Ser. No. 07/875,014, filed on Apr. 28, 1992, now abandoned which is incorporated by reference in its entirety.

BACKGROUND TO THE INVENTION

The present invention relates to a catalyst for the synthesis of chlorine dioxide. The catalyst is preferably a $Pd/Al_2O_3$ or palladium and another platinum group metal (e.g., $Pd+Pt/Al_2O_3$) or palladium and a Group IB metal (e.g., $Pd+Au/Al_2O_3$) catalyst containing $La_2O_3$ and $Nd_2O_3$ which has increased activity and a slower rate of deactivation.

Chlorine dioxide is known to act as a disinfecting or sterilizing agent for solutions and devices (e.g., contact lenses). Chlorine dioxide is generally produced from sodium chlorite solutions by catalysts (e.g., catalysts containing noble metals, described in U.S. Pat. No. 5,008,096). However, known catalysts have the disadvantage of becoming greatly deactivated within a matter of days.

SUMMARY OF THE INVENTION

An object of the present invention is to provide a novel chlorine dioxide generating catalyst having increased activity and a slower rate of deactivation than known catalysts. According to the present invention, this and other objects are preferably achieved with a $Pd/Al_2O_3$ or palladium and another platinum group metal (e.g., $Pd+Pt/Al_2O_3$) or palladium and a Group IB metal (e.g., $Pd+Au/Al_2O_3$) catalyst containing $La_2O_3$ and $Nd_2O_3$.

DETAILED DESCRIPTION OF THE INVENTION

Figure 1:
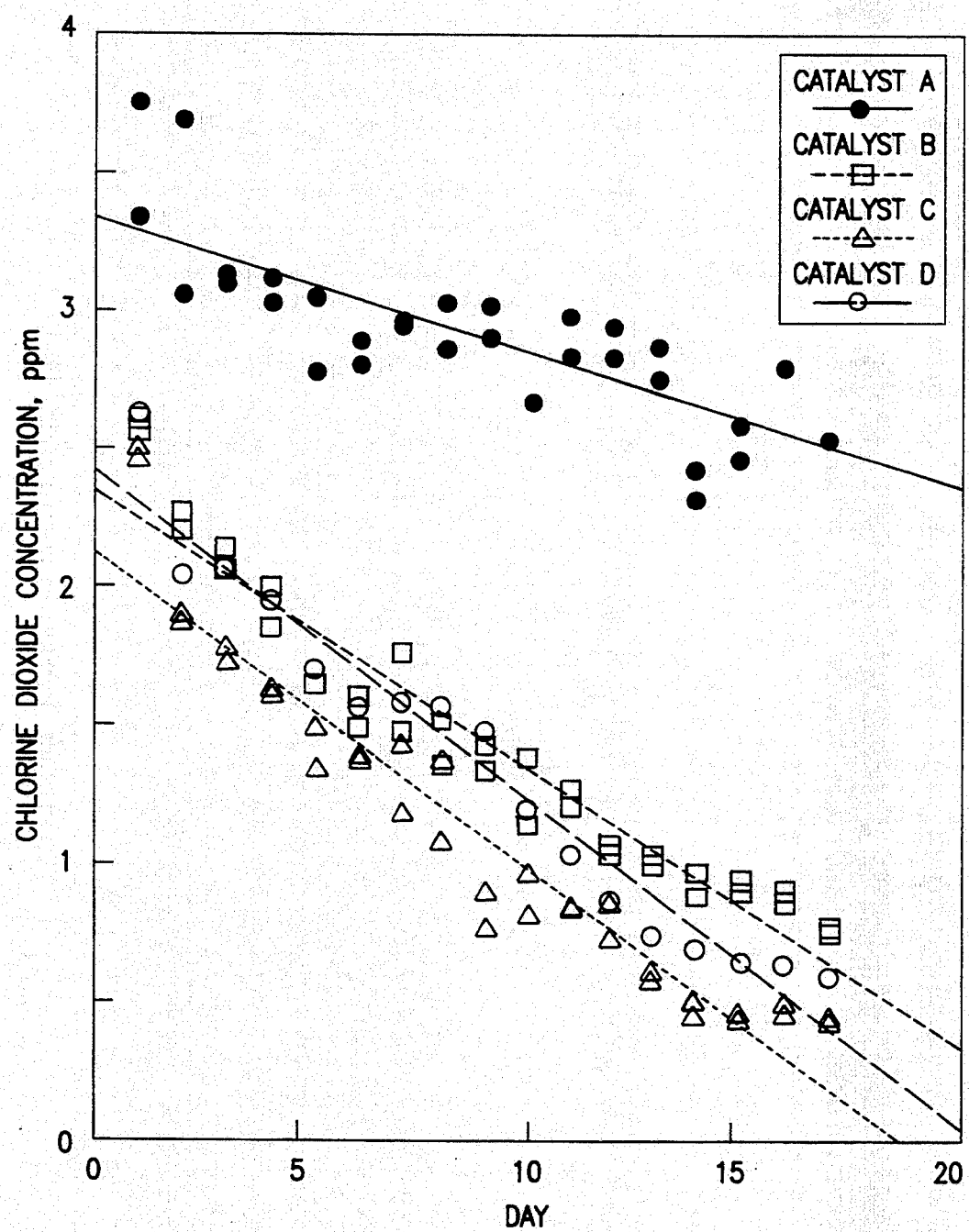
FIG. 1 is a graph of the catalysts deactivation profiles for catalysts A–D of Example 1.

A catalyst made for the generation of chlorine dioxide in accordance with this invention is comprised of at least one platinum group metal selected from ruthenium, rhodium, platinum, palladium and mixtures thereof or mixtures of such a platinum group metal (e.g., palladium) with a Group IB metal (Cu, Ag, Au). The catalytic metal must be present at a weight % of at least 0.1 and up to 20, preferably 1 to 10, based on the total weight of the catalyst. Palladium is preferred. Aqueous solutions of Group VIII and Group IB metal salts (i.e., halides and nitrates) can be used in the preparation of the catalyst. For example, the following ranges (wt/wt) can be used: ratio of Au to Pd, 0.01:1 to 2:1, preferably 0.2:1 to 0.8:1; ratio of Pt to Pd, 0.01:1 to 2:1, preferably 0.2:1 to 0.8:1.

The method of making the catalyst is illustrated with palladium, but other platinum group metals or combinations of palladium and another platinum group metal (e.g., $Pd+Pt/Al_2O_3$) or combinations of palladium and a Group IB metal (e.g., $Pd+Au/Al_2O_3$) can be substituted with comparable results.

The catalyst is supported by a catalyst support or matrix. Any suitable support material may be employed as the support or matrix for the platinum group metal provided that such support material is substantially inert when exposed to the conditions used in the enhanced generation of chlorine dioxide from a chlorine dioxide precursor in accordance with the present invention. The support must be thermostable and must provide high support area, such supports are known in the art. Examples of support materials which may be employed as an inert matrix for the catalyst constituent include polymeric materials (plastics), metals, gamma and alpha aluminas, silicas, clays, ceramics, and other refractory supports (e.g., titania, zirconia, silica-alumina), carbon, and the like. The support preferably contains $La_2O_3$ and/or $Nd_2O_3$ or other rare earth oxide promoters such as those of thorium and cerium. Preferably, alumina supports containing $La_2O_3$ and $Nd_2O_3$ are used. The supported component may have any suitable shape or configuration, such as sheets, rods, extrudates, tablets, pills, irregular shaped particles, spheres, disks, pellets and the like. Monoliths can also be used. Any of a number of conventional techniques can be employed to deposit the platinum group metal(s), or platinum group metal and Group IB metal, on the support material. These techniques include impregnation, co-precipitation, ion-exchange, dipping, spraying, vacuum deposits and the like.

The palladium or palladium and another platinum group metal (e.g., Pd+Pt) or palladium and a Group IB metal (e.g., Pd+Au) can be placed on the outside edge of the alumina particle in a number of ways known in the art. The preferred method is by promoting rapid hydrolysis of the water soluble salts of the noble metals when added to an alumina-water slurry. This can be achieved by preadjusting the pH of the noble metal salt solution to 1 to 6.3, depending on the metal salts used, prior to addition to the slurry. The concentration of the noble metal salt in the aqueous solution is not critical and can vary widely. After that, the process is continued by maintaining the pH of the slurry at 6 to 10 for several minutes at a temperature of 70° to 90° C., prior to the addition of a reducing agent.

The result of following these reaction conditions is that the finely divided alumina particles has the catalytically active metal, e.g., palladium (or Pd+Pt or Pd+Au), deposited on the exterior surface of the particle. The alumina particle can range from 0.01 to 4 mm in size, preferably 0.3 to 4 mm, though the upper limit is not critical. The penetration of the palladium (or Pd+Pt or Pd+Au) into the alumina particle can be determined by transmission electron microscopy.

Broadly, the method for enhancing generation of chlorine dioxide according to the present invention involves contacting an aqueous medium containing a chlorine dioxide precursor with a $Pd/Al_2O_3$ (or $Pd+Pt/Al_2O_3$ or $Pd+Au/Al_2O_3$) catalyst containing $La_2O_3$ and $Nd_2O_3$. The temperature at which the aqueous medium is maintained during contact of the chlorine dioxide precursor with the catalyst can vary widely. Preferably, the temperature is in the range of 5° C. to 80° C., and preferably 5° C. to 50° C. Typically the process is carried out at ambient temperature. The pH of the aqueous medium is usually in the range of 1 to 8, preferably 4 to 8. Generally, the catalyst contact time with the chlorine dioxide precursor ranges from 0.01 to 20 seconds.

Chlorine dioxide precursors which may be employed in the practice of the present invention are those compounds capable of generating, releasing or being converted to chlorine dioxide when contacted with a $Pd/Al_2O_3$ (or $Pd+Pt/Al_2O_3$ or $Pd+Au/Al_2O_3$) catalyst containing $La_2O_3$ and $Nd_2O_3$ under the reaction conditions previously described. Any metal chlorite salt capable of generating chlorine dioxide can be utilized as the chlorine dioxide precursor. Preferably, alkali metal chlorites are used, especially sodium chlorite in an aqueous medium. The amount of chlorine dioxide precursor present in the aqueous medium can vary widely and will be dependent upon the amount of chlorine dioxide to be generated. For example, it has been found that the amounts of chlorine dioxide precursor present in the aqueous medium can range from 0.0001 to 30 weight %, preferably 0.0005 to 10 weight %. Preferably, a chlorine dioxide complex sold by Bio-Cide International, Inc. of Norman, Okla. under the trademark Purogene ®, is used (described in U.S. Pat. No. 5,008,096, incorporated by reference in its entirety).

All kinds of contact lenses may be disinfected by utilizing chlorine dioxide produced by the catalysts of the present invention in a manner known in the art.

EXAMPLES

Example 1

Catalyst preparations:

A shell-type catalyst was prepared by suspending 47.5 g of Rhone-Poulenc Chemie spheralite 532, a gamma alumina containing 1.3% $La_2O_3$ and 0.5% $Nd_2O_3$ and ground to a particle size range of approximately 180–355 microns, in 250 ml of deionized water. To this suspension was added an aqueous solution of $H_2PdCl_4$ containing 2.5 g Pd. The pH of the palladium solution had been adjusted to 5.8 with caustic. After heating this suspension at 80° C. for 15 min. while maintaining the pH at approximately 6–7 with caustic, a solution of sodium hydroxide and formaldehyde was added and the mixture stirred for another 15 min. The alumina containing 5 wt % reduced palladium was filtered, washed with DI water and dried overnight at 120° C. This catalyst is designated Catalyst A.

A second catalyst was prepared in the same manner, but the support used was Rhone-Poulenc Chemie spheralite 531A, a gamma alumina which did not contain any $La_2O_3$ or $Na_2O_3$ but was ground to a particle size range of approximately 125–355 microns. This catalyst is designated Catalyst B.

A third catalyst was prepared in the same manner as the first catalyst, but the support used was Condea SCF-a100, a gamma alumina free of $La_2O_3$ and $Nd_2O_3$. This catalyst is designated Catalyst C.

A fourth catalyst was prepared in the same manner as the first catalyst, but the support used was Norton SA 3332, an alpha alumina free of $La_2O_3$ and $Nd_2O_3$. This catalyst is designated Catalyst D.

Catalysts A–D are described in Table 1.

TABLE 1

| Catalyst | Catalyst Descriptions | | | |
|---|---|---|---|---|
| | A | B | C | D |
| Palladium, wt % | 5 | 5 | 5 | 5 |
| Support Designation | 532 | 531A | SCF-a100 | SA 3332 |
| Alumina Phase | gamma | gamma | gamma | alpha |
| $La_2O_3$, wt % | 1.3 | 0 | 0 | 0 |
| $Nd_2O_3$, wt % | 0.5 | 0 | 0 | 0 |
| Particle Size Range, Microns | 180–355 | 125–355 | 125–180 | 180–355 |
| Pore Volume, cc/g | 0.72 | 0.78 | 0.50 | 0.61 |
| Surface Area, m²/g | 112 | 110 | 100 | 55 |

Example 2

Comparative Catalyst Performance:

Experiments were performed using the catalysts of Example 1 (Table 1) to determine their activity and stability to generate chlorine dioxide from an aqueous solution of sodium chlorite. 165 mg portions of catalyst were held in a cylindrical cell at room temperature. An aqueous solution of sodium chlorite (2 wt %) was passed over the catalyst bed at a rate of approximately 1 ml/sec. The steady-state concentration of $ClO_2$ generated in the outlet stream was measured each day over approximately an one hour period. The concentration of $ClO_2$ was measured using an ultraviolet spectrophotometer in a manner known in the art.

The results for Catalysts A–D described in Example 1 are presented in FIG. 1 and summarized in Table 2. Catalyst A prepared with an alumina support containing $La_2O_3$ and $Nd_2O_3$, is clearly more active and has a slower rate of deactivation over 17 days than Catalysts B–D.

TABLE 2

| Catalyst | Catalyst Performance | | | |
|---|---|---|---|---|
| | A | B | C | D |
| $ClO_2$ Conc. (ppm*): | | | | |
| Initial | 3.34 | 2.34 | 2.12 | 2.42 |
| Day 17 | 2.49 | 0.63 | 0.19 | 0.39 |
| Deactivation, % | 25.6 | 73.0 | 91.2 | 84.0 |

*Values based on linear regression analysis of data presented in FIG. 1.

Example 3

Effect of Group VIII Metal on Catalyst Activity

Catalysts according to the present invention were prepared containing Pt, Ru, or Pd. The performance of these catalysts is shown in Table 3. The $Pd/Al_2O_3$ catalyst is more active than the $Ru/Al_2O_3$ or $Pt/Al_2O_3$ catalysts (though both exhibit reactivity for chlorine dioxide).

These shell-type catalysts were made using the same methodology described in example 1. However, the support used was Rhone-Poulenc spheralite 509B (a gamma-alumina with a surface area of 340 m²/g).

TABLE 3

| Effect of Group VIII Metal on Catalyst Activity | | |
|---|---|---|
| Catalyst[1] | Catalyst Weight (mg) | $ClO_2$ Concentration (ppm) |
| 5% $Pd/Al_2O_3$ | 50.4 | 0.33 |
| 5% $Ru/Al_2O_3$ | 56.1 | 0.20 |
| 5% $Pt/Al_2O_3$ | 49.4 | 0.22 |

[1]powdered catalyst

Example 4

Effect of Palladium Distribution on Catalyst Activity

As shown in table 4, the distribution of palladium in the catalyst support affects catalyst activity. Resistance to diffusion of the reactant molecule (i.e., chlorine dioxide precursor) into the pores of the support leading to the reactive metal surface sites affects catalyst activity. To minimize this phenomenon, the catalytic metal is placed on the outside edge of the catalyst particle; hence the catalyst of the invention is referred to as a shell catalyst.

The activity of a $Pd/Al_2O_3$ catalyst in which the palladium is distributed on the outside edge of the alumina particles is two to four times the activity of a $Pd/Al_2O_3$ catalyst in which the palladium is uniformly distributed throughout the alumina. The activity of a $Pd/SiO_2$ catalyst in which the palladium is distributed on the outside edge of the silica particles is ten times the activity of a $Pd/SiO_2$ catalyst with uniform palladium distribution throughout the silica particle.

TABLE 4

| Catalyst* | Particle Size | Metal Distribution | $ClO_2$ Conc. (ppm) |
|---|---|---|---|
| E | 5% $Pd/Al_2O_3$ | 2–4 mm | shell | 0.159 |
| F | 5% $Pd/Al_2O_3$ | 2–4 mm | uniform | 0.039 |
| G | 5% $Pd/Al_2O_3$ | 355–710μ | shell | 0.635 |
| H | 5% $Pd/Al_2O_3$ | 355–710μ | uniform | 0.309 |
| I | 5% $Pd/SiO_2$ | 1.5 mm | shell | 0.374 |
| J | 5% $Pd/SiO_2$ | 1.5 mm | uniform | 0.030 |

*100 mg used

A shell-type $Pd/Al_2O_3$ catalyst (2–4 mm) was prepared by first spray impregnating 47.5 grams of alumina beads with an aqueous solution of $H_2PdCl_4$ containing 2.5 grams of Pd. The impregnated beads were then added to 300 ml of an aqueous solution of $Na_2CO_3$ (2 wt %) at 80° C. After 15 minutes a solution of sodium hydroxide and formaldehyde was added. The mixture containing the impregnated beads was allowed to stand at 80° C. for an additional 15 minutes. The alumina beads containing 5 wt % palladium were filtered, washed with deionized water and dried overnight at 120° C. This catalyst is designated Catalyst E.

A $Pd/Al_2O_3$ catalyst (2–4 mm) of uniform palladium distribution was prepared by first spray impregnating 47.5 grams of alumina beads with an aqueous solution of $H_2PdCl_4$ containing 2.5 grams of Pd. The impregnated beads were then added to 110 ml of an aqueous solution of NaOH (2 wt %) at 80° C. After 15 minutes a solution of sodium formate was added. The mixture containing the impregnated beads was allowed to stand at 80° C. for an additional 15 minutes. The alumina beads containing 5 wt % palladium were filtered, washed with deionized water and dried overnight at 120° C. This catalyst is designated Catalyst F.

A shell-$Pd/Al_2O_3$ catalyst (355–710 microns) was prepared by suspending 47.5 grams of alumina powder in 300 ml of deionized water. To this suspension was added an aqueous solution of $H_2PdCl_4$ containing 2.5 grams of Pd. The pH of the palladium solution had been adjusted to 5.8 with caustic. After heating this suspension to 80° C. for 15 minutes while maintaining the pH at approximately 6–7 with caustic, a solution of sodium hydroxide and formaldehyde was added and the mixture stirred for an additional 15 minutes. The alumina containing 5 wt % palladium was filtered, washed with deionized water and dried overnight at 120° C. This catalyst is designated Catalyst G.

A $Pd/Al_2O_3$ catalyst (355–710 microns) of uniform palladium distribution was prepared by suspending 47.5 grams of alumina powder in 300 ml of deionized water. This suspension was then heated at 80° C. At 80° C. an aqueous solution of $H_2PdCl_4$ containing 2.5 grams of Pd was added to the suspension. The pH was adjusted to 7 with caustic and stirred for 15 minutes while maintaining a pH of 7. Next an aqueous solution of sodium formate was added and the suspension stirred for an additional 15 minutes. The alumina containing 5 wt % palladium as filtered, washed with deionized water and dried overnight at 120° C. This catalyst is designated Catalyst H.

A shell-type $Pd/SiO_2$ catalyst (1.5 mm) was prepared by first spray impregnating 110 grams of silica beads with an aqueous solution of $H_2PdCl_4$ containing 5.8 grams of Pd. The impregnated beads were then added to 200 ml of an aqueous solution of NaOH (4 wt %) at room temperature and allowed to stand overnight. Next an aqueous solution of hydrazine hydrate was added and the mixture containing the impregnated beads allowed to stand an additional one hour. The silica beads containing 5 wt % palladium were filtered, washed with deionized water and dried overnight at 120° C. This catalyst is designated Catalyst I.

A $Pd/SiO_2$ catalyst (1.5 mm) of uniform palladium distribution was prepared by first spray impregnating 47.5 grams of silica beads with an aqueous solution of $H_2PdCl_4$ containing 2.5 grams of Pd. The impregnated beads were added to 155 ml of an aqueous solution of NaOH (3 wt %) at 80° C. After 15 minutes a solution of sodium formate was added. The mixture containing the impregnated beads was allowed to stand at 80° C. for an additional 15 minutes. The silica beads containing 5 wt % palladium were filtered, washed with deionized water and dried overnight at 120° C. This catalyst is designated Catalyst J.

Substitution of palladium in the examples of the present invention by platinum, rhodium, ruthenium or mixtures thereof would be expected to provide comparable results.

Example 5

Deactivation of Catalyst A

The desired catalyst for this application does not deactivate rapidly in the presence of $NaClO_2$ or $ClO_2$. Table 5 shows how the deactivation of catalyst A (from data in table 1) is dependent on how it was treated with an aqueous 150 ppm $NaClO_2$ solution.

TABLE 5

Deactivation Studies of Catalyst A

| Catalyst Treatment | Steady State ppm $ClO_2$ |
|---|---|
| Fresh Catalyst A | 2.18 |
| After 28 days of day to day reactions* | 0.4 |
| Kept in a 150 ppm $NaClO_2$ solution for 20 hours | 1.78 |
| Kept in a 150 ppm $NaClO_2$ solution for 19 days | 0.86 |
| Kept in a 150 ppm $NaClO_2$ solution for 2 days followed by drying at 23° C. in air for 17 days | 0.46 |
| Kept in a 150 ppm $NaClO_2$ solution for 2 days followed by washing it with DI water and drying at 23° C. in air for 17 days | 1.84 |
| Kept in an approx. 150 ppm $NaClO_2$ + approx. 1.5 ppm $ClO_2$ solution for 20 hours | 1.58 |

*These reactions were performed by passing 180 ml of a 150 ppm $NaClO_2$ solution over 50 mg of catalyst at the rate of 1 ml/s.

These activity tests were performed on 50 mg portions of the catalyst held in a cylindrical cell at room temperature. An aqueous solution of sodium chlorite (150 ppm) was passed over the catalyst at a rate of approximately 1 ml/sec. The steady state concentration of $ClO_2$ generated in the outlet stream was measured over a three minute period. The concentration of $ClO_2$ was measured using an ultraviolet spectrometer in a manner known in the art. According to the data in table 5, allowing the catalyst to dry with the $NaClO_2$ solution on it deactivates it the most. Washing the catalyst with DI water, after exposing it to the 150 ppm $NaClO_2$ solution for 2 days, deactivates it the least. Exposure of the catalyst to the $NaClO_2$ solution for 20 hours deactivates the catalyst very little, while exposure of the catalyst to the same solution for 19 days deactivates it to a greater extent. The poisoning of the catalyst is related to how long it is exposed to the $NaClO_2$ solution. Exposing the catalyst to a solution which contains both $NaClO_2$ and $ClO_2$ for 20 hours deactivates it more than a solution which only contains $NaClO_2$.

Figure 2:
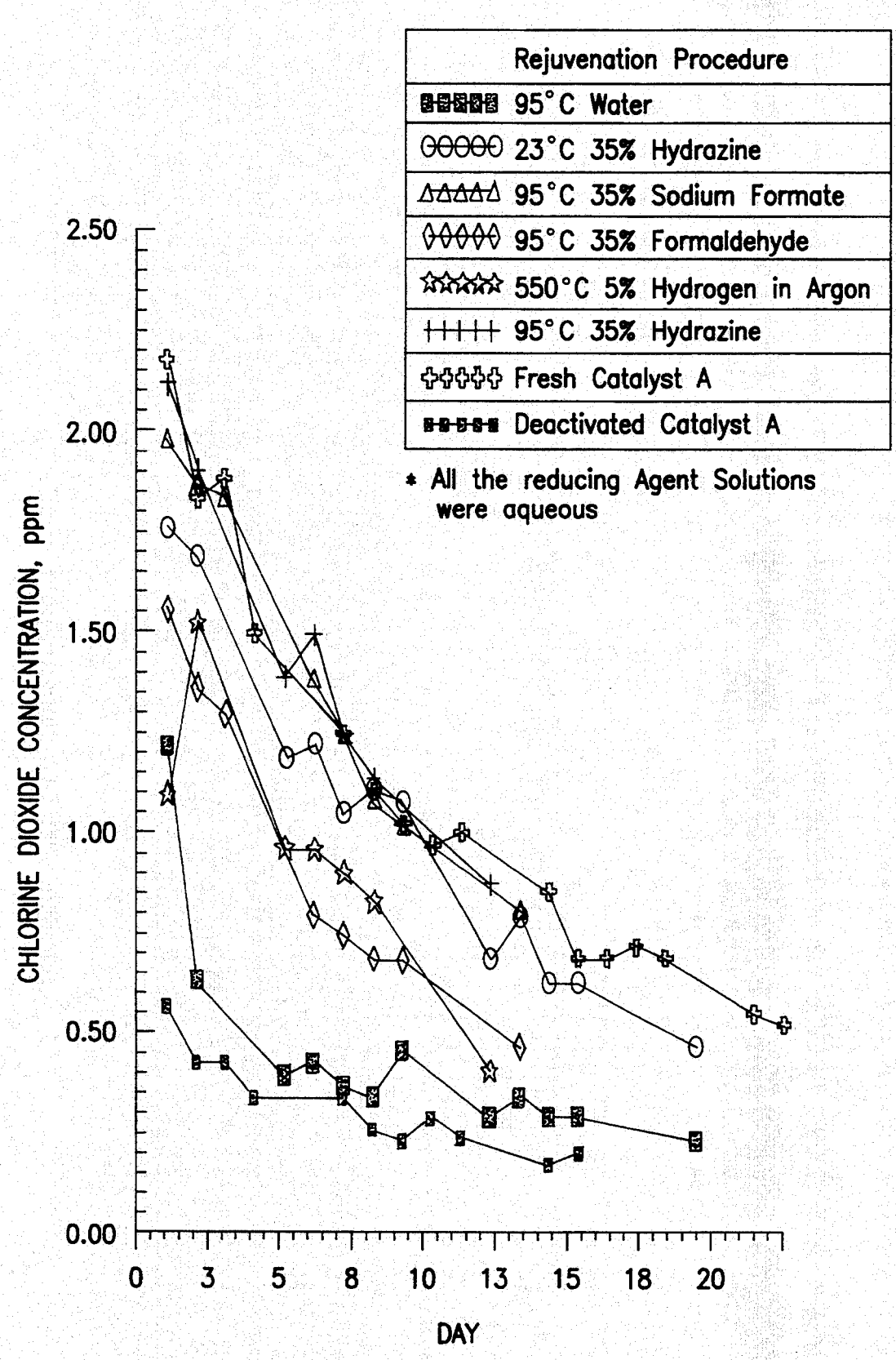
FIG. 2 is a graph of the rejuvenation of deactivated catalyst A by different procedures.

A sample of catalyst A was deactivated to the steady state value of 0.57 ppm $ClO_2$ by passing a large volume of $NaClO_2$ solution over it. As shown in FIG. 2, this deactivated catalyst was treated by different procedures in an effort to rejuvenate it. The liquid rejuvenation methods involved using 25 ml of solution for every 100 mg of catalyst for 30 minutes, while the 5% $H_2$ in Ar treatment was done in the gas phase over 100 mg of catalyst with the flow of 30 ml/minutes for 10 minutes. The day to day activity tests shown in this figure were performed in the manner described above. While water at 95° C. did not rejuvenate the catalyst very well, the reducing agents such as hydrazine, formaldehyde, and sodium formate worked the best. The aforementioned data suggests that the catalyst interacts with generated $ClO_2$ to form an oxidized Pd species. The main emphasis of this work was to develop a catalyst that does not oxidize, and therefore deactivate, in the presence of $NaClO_2$ and $ClO_2$.

Example 6

Effect of Alloying Pd on Catalyst Activity

Figure 3:
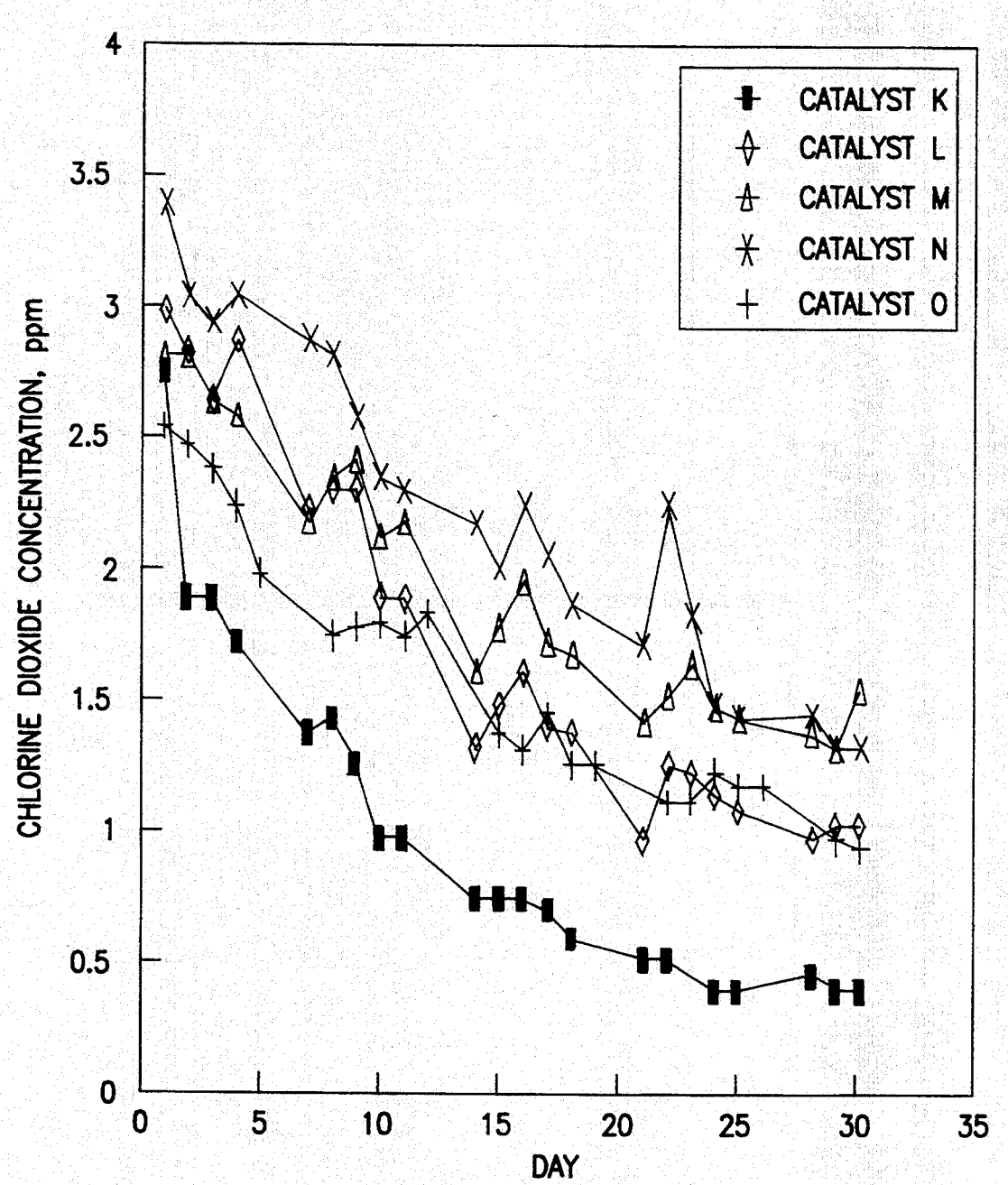
FIG. 3 is a graph of the effect of alloying Pd with Au, Ag or Pt on catalyst deactivation.

As shown in Table 6 and FIG. 3, the alloying of Pd with Pt, Ag or Au decreases the rate of deactivation.

Catalyst K was prepared by suspending 48.3 grams of Rhone-Poulenc Chemie spheralite 532, a gamma alumina containing 1.3% $La_2O_3$ and 0.5% $Nd_2O_3$ and ground to a particle size range of 75 to 212 microns, in 250 ml of deionized water. To this suspension was added an aqueous solution of palladium nitrate containing 2.5 grams of Pd. The pH of the Pd solution had been adjusted to 1.0 with sodium carbonate. After heating this suspension at 80° C. for 15 min., while maintaining the pH at approximately 6-7 with sodium carbonate, a solution of sodium hydroxide and formaldehyde was added and the mixture stirred for another 15 min. The alumina containing 4.9 wt % reduced palladium was filtered, washed with DI water, and dried overnight at 120° C.

Catalyst L was prepared by suspending 94.7 grams of Rhone-Poulenc Chemie spheralite 532, a gamma alumina containing 1.3% $La_2O_3$ and 0.5% $Nd_2O_3$ and ground to a particle size range of 75 to 212 microns, in 500 ml of deionized water. To this suspension was added an aqueous solution of palladium nitrate and tetrachloro auric acid. This precious metal solution consisted of 5.0 grams of Pd and 2.0 grams of Au, and its pH had been adjusted to 1.0 with sodium carbonate. After heating this suspension at 80° C. for 15 min., while maintaining the pH at approximately 9-10 with sodium carbonate, a solution of sodium hydroxide and formaldehyde was added and the mixture stirred for another 15 min. The alumina containing 4.9 wt % reduced palladium and 2.0 wt % reduced gold was filtered, washed with DI water, and dried overnight at 120° C.

Catalyst M was made in the same manner as catalyst L except that the final catalyst consisted of 4.9% Pd and 3.0% Au.

Catalyst N was prepared by suspending 94.7 grams of Rhone-Poulenc Chemie spheralite 532, a gamma alumina containing 1.3% $La_2O_3$ and 0.5% $Nd_2O_3$ and ground to a particle size range of 75 to 212 microns, in 500 ml of deionized water. To this suspension was added an aqueous solution of palladium nitrate and platinum nitrate. This precious metal solution consisted of 5.0 grams of Pd and 2.0 grams of Pt, and its pH had been adjusted to 1.0 with sodium carbonate. After heating this suspension at 80° C. for 15 min., while maintaining the pH at approximately 6-7 with sodium carbonate, a solution of sodium hydroxide and formaldehyde was added and the mixture stirred for another 15 min. The alumina containing 4.9 wt % reduced palladium and 2.0 wt % reduced platinum was filtered, washed with DI water, and dried overnight at 120° O.

Catalyst O was prepared by suspending 95.2 grams of Rhone-Poulenc Chemie spheralite 532, a gamma alumina containing 1.3% $La_2O_3$ and 0.5% $Nd_2O_3$ and ground to a particle size range of 75 to 212 microns, in 500 ml of deionized water. To this suspension was added an aqueous solution of palladium nitrate and silver nitrate. This precious metal solution consisted of 5.0 grams of Pd and 1.1 grams of Ag, and its pH had been adjusted to 1.0 with sodium carbonate. After heating this suspension at 80° C. for 15 min., while maintaining the pH at approximately 9-10 with sodium carbonate, a solution of sodium hydroxide and formaldehyde was added and the mixture stirred for another 15 min. The alumina containing 4.9 wt % reduced palladium and 4.9 wt % reduced palladium and 1.1 wt % reduced silver was filtered, washed with DI water, and dried overnight at 120° C.

Experiments were performed using catalysts K, L, M, N and O to determine their activity and stability to generate chlorine dioxide from an aqueous solution of sodium chlorite. In these tests 50 mg portions of the catalyst were held in a cylindrical cell at room temperature. An aqueous solution of sodium chlorite (150 ppm) was passed over the catalyst at a rate of approximately 1 ml/sec. The steady state concentration of $ClO_2$ generated in the outlet stream was measured each day over a three minute period. The concentration of $ClO_2$ was measured using an ultraviolet spectrometer in a manner known in the art.

TABLE 6

| Effect of Alloying Pd with Pt, Ag and Au on Catalyst Activity | | | | | |
|---|---|---|---|---|---|
| Catalyst | K | L | M | N | O |
| Palladium, wt % | 4.9 | 4.9 | 4.9 | 4.9 | 4.9 |
| Gold, wt % | — | 2 | 3 | — | — |
| Platinum, wt % | — | — | — | 2 | — |
| Silver wt % | — | — | — | — | 1.1 |
| Support Designation | 532 | 532 | 532 | 532 | 532 |
| $ClO_2$ Conc. (ppm): | | | | | |
| Initial | 2.75 | 2.99 | 2.81 | 3.39 | 2.54 |
| Day 15 | 0.75 | 1.49 | 1.78 | 2.01 | 1.38 |
| Day 30 | 0.4 | 1.03 | 1.55 | 1.32 | 0.94 |
| Deactivation, %: | | | | | |
| Day 15 | 72.7 | 50.2 | 36.7 | 40.7 | 45.7 |
| Day 30 | 85.5 | 65.6 | 44.8 | 61.1 | 63 |

By substituting Cu for Au or Ag (as shown in the preparation of catalyst L or M or O in Table 6), comparable results are obtained.

Further variations and modifications of the invention will become apparent to those skilled in the art from the foregoing and are intended to be encompassed by the claims appended hereto.

U.S. Pat. Nos. 5,008,096; 4,731,192; and 4,362,707 are incorporated by reference in their entirety.

What is claimed:

1. A method for generating chlorine dioxide from a chlorine dioxide precursor, said method comprising contacting an aqueous medium containing a chlorine dioxide precursor with a catalyst consisting essentially of a support selected from the group consisting of alpha alumina, gamma alumina, and silica supports, said supports containing $La_2O_3$ and/or $Nd_2O_3$ wherein the outside edge of said support is impregnated with palladium or palladium and another platinum group metal or palladium and a Group IB metal.

2. The method according to claim 1 wherein the temperature is 5° to 80° C.

3. The method of according to claim 2 wherein the temperature is 5° to 50° C.

4. The method of according to claim 1 wherein the pH of said aqueous medium is 1 to 8.

5. The method of claim 4 wherein the pH is from 4 to 8.

6. The method of claim 1 wherein the time of the contact between said catalyst and said chlorine dioxide precursor ranges from 0.01 to 20 seconds.

* * * * *